June 23, 1959   F. A. GRAHAM   2,891,682
STABILIZING MEANS FOR TRUCK

Filed Feb. 15, 1957   2 Sheets—Sheet 1

INVENTOR.
FRANK A. GRAHAM
BY
ATTORNEY

June 23, 1959     F. A. GRAHAM     2,891,682
STABILIZING MEANS FOR TRUCK

Filed Feb. 15, 1957     2 Sheets-Sheet 2

INVENTOR.
FRANK A. GRAHAM
BY
ATTORNEY

United States Patent Office 2,891,682
Patented June 23, 1959

2,891,682

STABILIZING MEANS FOR TRUCK

Frank A. Graham, York, Pa., assignor to Side-O-Matic Unloader Corporation, York, Pa., a corporation of Pennsylvania Application February 15, 1957, Serial No. 640,397

3 Claims. (Cl. 212—145)

This invention relates to a stabilizer for a truck end, more particularly, for a truck provided with a boom used for example in loading and unloading heavy objects such as cement blocks, during the course of which operations the boom swings from one side or the other of the truck and tends to tilt the same. A truck of the type to which the present invention particularly is applicable is illustrated in U.S. Patent No. 2,772,795, dated December 4, 1956.

Particularly when a loading assembly such as illustrated in said patent is applied to a relatively light weight truck, and especially when only a small amount of load weight is present upon the bed of the truck as near the end of an unloading operation or near the commencement of a loading operation, the boom with a load suspended near the outer end thereof and extending laterally from one side of the truck has considerable tendency to tilt the truck. Trucks having relatively heavy bodies are not nearly so subject to such tilting operation as lighter weight trucks. However, even when using a relatively heavy truck for such purposes, it is desirable to limit such tilting action but such limiting is even more desirable in trucks having a relatively light weight body.

The principal object of the present invention is to provide stabilizing means either at one or both sides of a truck body to minimize the tilting of said body during the operation of a boom thereon while loading or unloading the truck, such stabilizing structure being of such nature as to be fool-proof in operation and free from possibilities of damage either to the stabilizing mechanism or the truck under any conditions of use.

Still another object of the invention is to provide a relatively universal stabilizer structure for truck bodies which will function automatically to limit the tilting of the truck body and when the stabilizer is not being used, means are provided by which the stabilizer structure may be mounted or stowed in an inoperative position.

Still a further object of the invention however is to provide characteristics in the universal stabilizer structure referred to above, whereby even if an operator neglects to move the stabilizer mechanism to inoperative position, such mechanism normally will not engage the road bed or similar surface over which the truck is being moved; nor will the stabilizer structure be injured in the event a truck should drift or sway during loading and unloading operations.

Details of the foregoing objects and of the invention, as well as other objects thereof, are set forth in the following specification and illustrated in the accompanying drawings comprising a part thereof.

Figure 1:
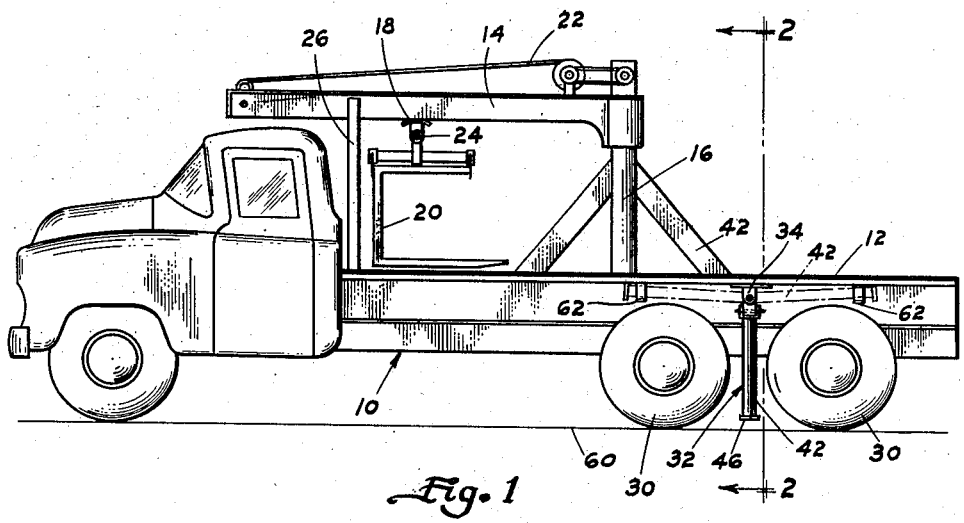
Fig. 1 is a side elevation of an exemplary truck to which universal stabilizer structure embodying the principles of the present invention have been applied.

An exemplary truck 10 of the type illustrated in Patent No. 2,772,795 is shown in side elevation in Fig. 1. In addition to the conventional features of the truck, it includes a bed 12 upon which heavy objects such as cement blocks or the like may be loaded and from which they may be unloaded by a boom 14 pivotally movable at one end about a vertical axis coincident with the vertical mast 16. In actual practice, the boom 14 may be of the order of 12 to 16 feet in length and a sheave 18 is movable longitudinally along said boom for purposes of supporting a material engaging and supporting member 20 such as a pronged fork which, when being used with cement blocks, is capable of engaging the same by the prongs of the fork extending through certain holes in the lower layer of the cement blocks.

Operating cable means 22 serves not only to move the sheave 18 longitudinally along the boom 14 but also to raise and lower the fork sheave 24 vertically. For convenience, a stationary support 26 is mounted upon the truck to support the outer end of the boom 14 in inoperative position as when the truck is moving along the road with a load to deliver the same or returning to the yard after the delivery of a load.

Figure 2:
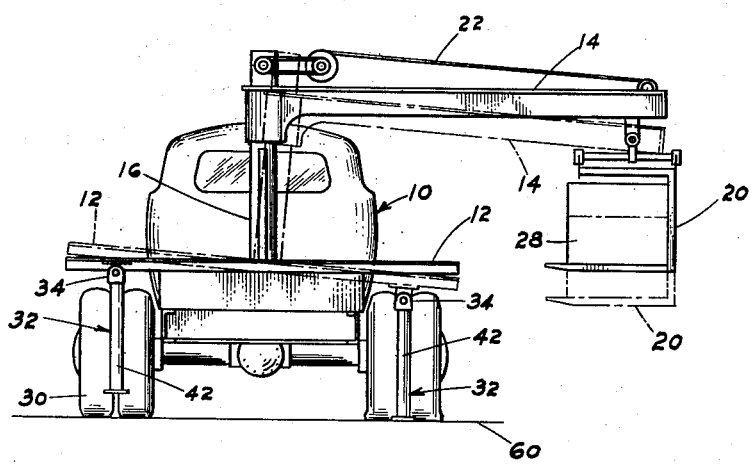
Fig. 2 is a rear elevation of the truck and stabilizer arrangement of Fig. 1, taken on the line 2—2 of said figure and illustrating in full lines the untilted position of the truck, and in broken lines showing an exemplary tilted position of the truck and the manner in which the stabilizer structure functions.

Referring to Fig. 2, the boom 14 is shown in full lines in laterally projected position from one side of the truck bed 12. When the fork 20 is loaded for example with a cube of cement blocks 28, which may weigh in the vicinity of 3,000 pounds, a relatively light weight truck does not have adequate bracing force to prevent substantial tilting of the boom 14, especially when a load is supported from near the outer end thereof. Hence, it is not uncommon for the boom 14 to tilt past a broken line position indicated in Fig. 2, particularly where the truck is of relatively light weight construction. Accordingly, the bed 12 also will be tilted past an exemplary broken line position shown in Fig. 2. Such tilting may produce an undesirable strain upon the truck and there may be even sufficient tilting to tend to elevate the outside pair of rear wheels 30 from the road or other surface under such conditions, particularly when the truck is of sufficiently light construction that the suspended load overcomes the inherent gravitational force of the truck.

The use of various kinds of stabilizing means in connection with trucks to prevent undue tilting of the same, particularly in regard to trucks upon which power shovels and the like are mounted, is not unknown. Certain examples of previously used stabilizing means comprise the provision of horizontally slidable I-beams having footed members threadably adjustable in the outer ends of the beams, whereby the beams may be projected for example from opposite sides of the truck and the footed members screwed downwardly into contact with the ground. Such arrangements however are adaptable primarily only to heavy duty trucks in which the use of the trucks warrants the use of such added weight and expensive stabilizing means. Such stabilizing means are far more expensive and heavy than is required in connection with trucks for carrying cement blocks for example. Accordingly, the principal object of the present invention is to provide preferably universal stabilizing mechanism of inexpensive and simple nature which is fool-proof in operation and may be added especially to trucks for carrying cement blocks without undue expense or added weight.

Referring to the figures, it will be seen that the exemplary illustration of the preferred embodiment of universal stabilizing mechanism comprising the present invention consists of a unit 32, the details of which are best shown in Figs. 3 through 6. One end of the unit 32 comprises a universal joint 34 consisting of a pair of yoke members 36 and 38 which are pivotally connected by a connecting member 40. In operative position, a stand member 42, which may comprise a relatively inexpensive section of steel tubing, is connected at its upper end to a lug 44 depending from the lower end of yoke 38. Said lug 44 may be press-fitted or otherwise fixedly connected to the upper end of stand member 42. The opposite or lower end of stand member 42 is connected to a foot plate 46 provided with a lug 48 on its upper surface which may be press-fitted into the lower end of stand member 42 or otherwise secured thereto. Details of this construction are shown particularly in Figs. 3 and 6. If desired, the foot plate 46 may be wider sideways than its length in order to afford greater resistance against sinking into the ground when engaging the same and yet cooperate more effectively with latching means to be described.

Figure 3:
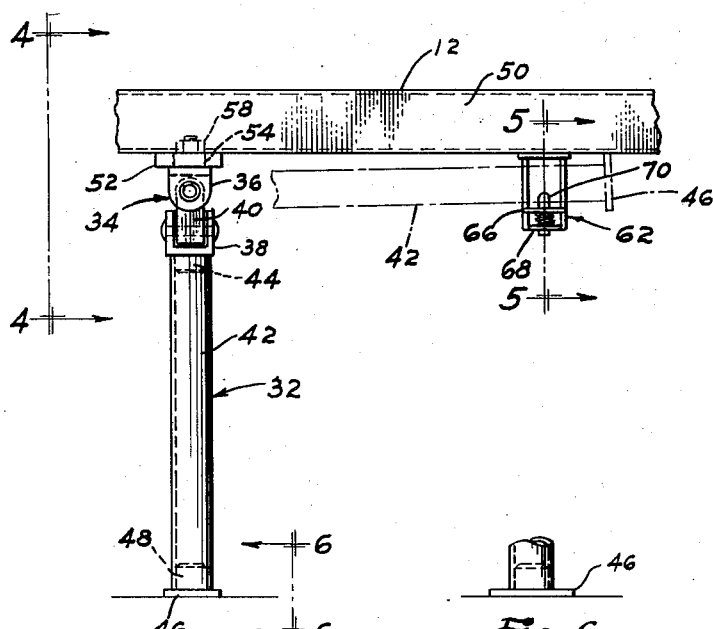
Fig. 3 is a fragmentary side elevation, on a larger scale than used in Figs. 1 and 2, and illustrating a universal stabilizer unit embodying the principles of the present invention, said unit being illustrated in operative position in full lines, and in inoperative or stowed position in broken lines.
Figure 6:
Fig. 6 is a fragmentary vertical elevation of the lower portion of the stabilizer member as viewed from the line 6—6 of Fig. 3.
Figure 4:
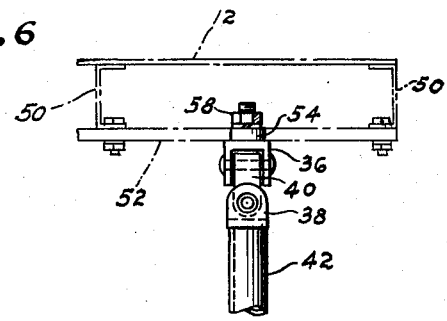
Fig. 4 is a fragmentary sectional elevation taken on the line 4—4 of Fig. 3.

The bed 12 of the truck 10 is composed of a series of channel members 50, best shown in Figs. 3 and 4, these being covered by a deck plate forming the bed 12. The channel members 50 preferably extend lengthwise of the bed 12 and for purposes of conveniently connecting the stabilizer unit 32 thereto, any suitable attaching means such as a steel plate 52 may be connected to the lower flanges of the channels 50. The plate 52 should be of sufficient thickness to provide adequate rigidity and resist bending when tilting force is applied against the stabilizing unit 32. The yoke 36 of universal joint 34 preferably has a lug 54 which extends through an opening in plate 52, the base of the yoke 36 forming a shoulder which bears against plate 52 as clearly shown in Fig. 4. A suitable threaded extension 56 projects upwardly from lug 54 of yoke 36 and receives a locking nut 58, there preferably being a lock washer beneath the nut so as to bear upon plate 52 and provide a frictional but swivel connection for the yoke 36 and the entire universal joint relative to plate 52.

One of the principal advantageous features of the invention is to so construct the stabilizer unit 32 that the overall length thereof is preferably a few inches less than the distance between the bed 12 and the roadway 60 or other surface over which the truck is to be moved. Hence, even when the truck is loaded, there preferably is several inches of space between the undersurface of the foot plate 46 and the road surface 60, whereby the stabilizer unit may be left in depending or operative position as illustrated in Figs. 1 through 3, without engagement between the foot plate 46 and the roadway. Hence, even if the driver of the truck should forget to stow the stand member 42 in its inoperative position shown in dotted lines in Fig. 1 for example, no damage will be sustained by the stabilizer unit, the truck, or the roadway under such circumstances.

Under situations where the truck is provided with a double axle construction at the rear as shown in Fig. 1, the stabilizer unit 32 may be mounted so as to depend between the pairs of wheels at each side of the truck and, preferably, a stabilizer unit is mounted at each side of the truck as shown in Fig. 2. If desired however, the stabilizer units may be mounted just forwardly of the rear wheels and, preferably, such stabilizer unit should be reasonably close to the vertical axis of the mast 16, considered in the longitudinal direction of the bed of the truck. By such an arrangement, twisting of the body during loading and unloading operations is minimized.

From the foregoing, it will be seen that the preferred construction of the stabilizer unit 32 is such that it is non-adjustable longitudinally and, when adapted to a particular truck, the stand member 42 of each unit is selected so as to be of such length that a space normally will be provided between the foot plate 46 thereof and the roadway surface when the truck is loaded and in non-tilting position. Such length easily can be specified in ordering a pair of stabilizer units for a particular truck installation and the unit easily can be fabricated for delivery for installation upon the truck.

Figure 5:
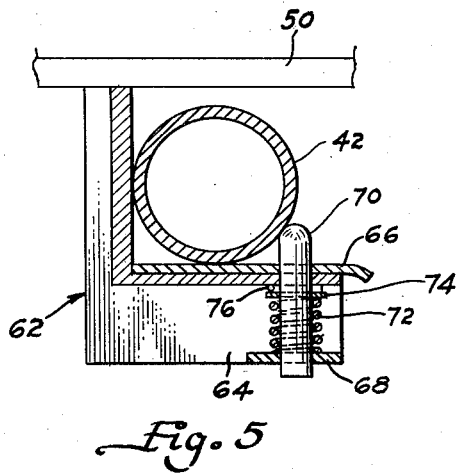
Fig. 5 is a vertical sectional elevation, on a scale larger than in the preceding figures, and taken on the line 5—5 of Fig. 3 for purposes of illustrating details of the latching mechanism for holding the stabilizer member in stowed position.

When the stabilizer unit and particularly the stand members 42 thereof is not being used in a stabilizing function, it may be mounted in one of two possible stowed positions shown in broken lines for example in Fig. 1. One of these positions also is shown in broken lines in Fig. 3. Bracket means 62 preferably comprising L-shaped members having horizontal projections 64 for engaging a portion of and supporting the stand member 42 of each stabilizing unit may be connected by any suitable means such as bolting or welding to one of the channel members 50 of the bed 12 of the truck for example. Details of the bracket means 62 are best shown in Fig. 5. If desired, a slide shoe 66 may be fixed to the projection 64 of each bracket and such projection also is provided with a horizontal ear 68. The slide shoe 66 and ear 68 are provided with vertically aligned holes for receiving a locking pin 70 which is preferably rounded at its upper end. A compressible spring 72 surrounds locking pin 70 and is compressed between the ear 68 and a washer 74. A suitable pin 76 such as a cotter pin, extends through the pin 70 at the upper side of washer 74. In operation, it is simply necessary to pivotally move the lower end of stand member 42 outwardly from between the wheels 30 for example and swively move the outer end of said member toward the supporting bracket 62, somewhat slamming the member 42 against the upper end of pin 70 to depress it and permit the member 42 to move fully into stowed position upon the bracket means 62 as shown in Fig. 5. At the end of such movement, the locking pin 70 automatically will be elevated to detachably secure the stand member in supporting position upon the bracket means 62. Removal thereof from the bracket means may be achieved by forceably pulling the outer end of stand member 42 laterally from the bracket and depressing locking pin 70.

As stated above, if desirable, a pair of the bracket means 62 may be mounted at each side of the truck 10 as shown in Fig. 1. However, only a single bracket at each side of the truck is necessary. Further, the details of the bracket means 62 are simple and efficient in operation, as well as being fool-proof. Even though an operator should neglect to stow the stand member 42 upon the bracket means 62 however following the delivery of a load for example, and should drive the truck away with the stand member 42 depending either from one or both sides of the truck, no injury to either the stand member, the truck, or the roadway will occur because of the space normally existing between the lower surface of the foot plate 46 of the stand members and the roadway when the truck is in non-tilted position as when the boom is stowed in the inoperative position thereof shown in Fig. 1.

In operation, when the boom 14 for example is disposed laterally beyond one side of the truck and tilts the bed 12 thereof as shown in broken line position in Fig. 2, the lower end of the right-hand stand member 42, as viewed in Fig. 2, will engage the roadway 60 or other surface onto which blocks are to be unloaded for example, or from which they are being loaded, and thus will limit the tilting movement of the truck. Under such circumstances, the left-hand stand member 42, as viewed in Fig. 2, will have its lower end elevated even further above the road surface 60. However, upon shifting the boom to extend from the left-hand side of the truck as viewed in said figure, then the left-hand stand 42 will be brought into operation by abutting the lower end of the same against the road surface 60. Hence, it is preferred that a stabilizer unit 32 be provided at each side of the bed of the truck and preferably connected thereto adjacent the outer edges of these sides of the truck.

During a loading or unloading operation for example, should the truck tend to drift or because of soft ground or otherwise it might tend to slide slightly sidewise, the universal joints 34 by which the upper ends of the stand member 42 are connected to the bed of the truck will permit the stand members 42 nevertheless to perform their stabilizing function nothwithstanding such shifting of the truck. No harm will occur either to the truck or the stabilizer units under such circumstances and hence the function of the units 32 is substantially universal in character.

From the foregoing, it will be seen that the stabilizer units embodying the principles of the present invention are simple in construction, inexpensive to fabricate and install, are fool-proof in operation, and provide adequate stabilizing to a truck or other vehicle of the type referred to in the foregoing and particularly a mobile unit having a boom-like member thereon which is designed to be projected laterally from one side or the other of the truck, thereby inducing tilting of the truck bed or body. Such stabilizer units require no adjustment of any kind in order to render the same effective to limit the tilting of the bed of a mobile unit and thereby stabilize the same within predetermined limits. Even though drifting or shifting of the truck occurs while being stabilized by said units, no damage is sustained either by the units or the mobile truck or other vehicle. Still further, even though the operator should neglect to move the stabilizer units and particularly the stand members thereof to their intended inoperative position at the completion of the intended operation of the vehicle, upon the stowing of the boom in its inoperative position or otherwise restoring the truck bed or body to its normal substantially level position, the lower ends of the stabilizer units automatically will be elevated from engagement with a roadway or other surface and no harm will occur either to the units or the vehicle under such circumstances.

While the invention has been described and illustrated in its preferred embodiment, and has included certain details, it should be understood that the invention is not to be limited to the precise details herein illustrated and described since the same may be carried out in other ways falling within the scope of the invention as claimed.

I claim:

1. A truck body bed provided with a boom movable past the side of said body in loading or unloading said truck, whereby said body bed tilts under the influence of a load upon said boom, in combination with a stabilizer movably connected to the side of said truck body bed from which said boom is to be projected in use, said stabilizer comprising an elongated member of predetermined fixed length, means pivotally connecting one end of said member to the truck at said side of the truck body bed beneath the deck thereof and inward from the outer side edge of said bed and depending freely therefrom in use for movement about an axis substantially parallel to the longitudinal axis of the body, foot means on the lower end of said member arranged to engage the ground beneath the body bed when said body bed is tilted during use by said boom, thereby to limit such sidewise tilting movement of said truck body bed, the predetermined fixed length of said member and foot means thereon being slightly less than the distance between the truck body and ground when the truck body bed is not tilted by the boom, whereby the footed end of the depending stabilizer does not engage the ground when the truck body bed is positioned normally in non-tilted position as when moving along a road or other surface but said member depending substantially vertically during tilting of said truck body, thereby causing relative movement between said member and body about said axis of movement until the foot means on said member engages the ground.

2. The truck body according to claim 1 further including retaining means comprising a hook member carried by said truck body bed adjacent the underside thereof and spaced from said pivotal connection of said stabilizer member to said body, whereby said depending end of said stabilizer may be moved pivotally upward to engage a portion of said stabilizer member with said hook member of said retaining means and detachably hold said stabilizer member in inoperative position on said truck body bed.

3. The truck body according to claim 2 further characterized by said retaining means comprising a snap-acting lock means adjacent the outer end of the hook member and operable to hold said member detachably upon said hook member.

References Cited in the file of this patent

UNITED STATES PATENTS

| 708,045 | Houdyshell | Sept. 2, 1902 |
| 2,405,578 | Holmes | Aug. 13, 1946 |
| 2,439,085 | Grzech | Apr. 6, 1948 |
| 2,828,868 | Odoran | Apr. 1, 1958 |

FOREIGN PATENTS

| 362,275 | Great Britain | Dec. 3, 1931 |